US009817549B2

(12) United States Patent
Chandrasekaran

(10) Patent No.: US 9,817,549 B2
(45) Date of Patent: Nov. 14, 2017

(54) METHOD AND SYSTEM FOR AUTO SWITCHING APPLICATIONS BASED ON DEVICE ORIENTATION

(71) Applicant: Verizon Patent and Licensing Inc., Arlington, VA (US)

(72) Inventor: Arthanari Chandrasekaran, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 258 days.

(21) Appl. No.: 14/314,816

(22) Filed: Jun. 25, 2014

(65) Prior Publication Data

US 2015/0378520 A1 Dec. 31, 2015

(51) Int. Cl.
*G06F 3/14* (2006.01)
*G06F 3/0482* (2013.01)
*H04M 1/725* (2006.01)
*G06F 3/0484* (2013.01)
*G06F 3/01* (2006.01)

(52) U.S. Cl.
CPC ............ *G06F 3/0482* (2013.01); *G06F 3/017* (2013.01); *G06F 3/04842* (2013.01); *H04M 1/7253* (2013.01); *H04M 1/72522* (2013.01); *H04M 2250/12* (2013.01); *H04M 2250/22* (2013.01)

(58) Field of Classification Search
CPC ..................................... G06F 3/14; G06F 3/17
USPC ......... 715/716, 753; 345/173, 649; 713/324; 455/566; 348/77, 208.4; 701/501
See application file for complete search history.

(56) References Cited

U.S. PATENT DOCUMENTS

| 8,564,544 | B2* | 10/2013 | Jobs | G06F 3/0488 |
| | | | | 345/173 |
| 9,047,047 | B2* | 6/2015 | Visosky | G06F 1/1616 |
| 2010/0088532 | A1* | 4/2010 | Pollock | G06F 1/1626 |
| | | | | 713/324 |
| 2011/0228112 | A1* | 9/2011 | Kaheel | H04N 1/00127 |
| | | | | 348/208.4 |
| 2012/0218302 | A1* | 8/2012 | Sirpal | G06F 1/1616 |
| | | | | 345/649 |
| 2012/0225693 | A1* | 9/2012 | Sirpal | G06F 1/1616 |
| | | | | 455/566 |
| 2012/0262379 | A1* | 10/2012 | King | G06F 3/1454 |
| | | | | 345/173 |
| 2013/0128022 | A1* | 5/2013 | Bose | H04N 7/18 |
| | | | | 348/77 |
| 2015/0113446 | A1* | 4/2015 | Penha | G06F 3/0484 |
| | | | | 715/753 |
| 2015/0233718 | A1* | 8/2015 | Grokop | G01C 21/165 |
| | | | | 701/501 |

* cited by examiner

*Primary Examiner* — Ruay Ho

(57) ABSTRACT

A system and method are presented for automatically switching to different applications, settings, or GUIs based on orientation of a mobile device. The system provides a user with the ability to maximize screen "real estate," limit the number of user inputs required to perform a particular action, and to maximize efficiency when using a mobile device. In some examples, the system allows a user to access multiple applications or user menus by changing the mobile device's orientation from a first orientation to a second orientation. The system may also allow the user to establish which actions take place upon changing the mobile device's orientation.

23 Claims, 11 Drawing Sheets

0 Deg

90 Deg

270 Deg

180 Deg

METHOD AND SYSTEM FOR AUTO SWITCHING APPLICATIONS BASED ON DEVICE ORIENTATION

FIELD OF THE INVENTION

The field of the present invention relates generally to facilitating auto switching of applications based on the orientation of a mobile device.

BACKGROUND

Effectively utilizing the limited amount of screen "real estate" on a mobile device has presented many challenges. Moreover, the number of applications that are simultaneously open or used on a mobile device seems to be steadily increasing, particularly with advancements in mobile device processing power. Users often need or want to use more than one application in parallel or in coordination. Switching between multiple applications on a mobile device has proven to be cumbersome, particularly because of the limited amount of screen real estate and the number of clicks or taps required. Conventional mobile operating systems and/or applications require a user to press a button and/or touch a screen, often more than once, in order to switch between different applications, change settings, or output a different graphical user interface. The present disclosure addresses these and other types of limitations.

BRIEF DESCRIPTION OF THE DRAWINGS

In order to facilitate a fuller understanding of the exemplary embodiments, reference is now made to the appended drawings, in which like reference characters are used to indicate like elements. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. The following description is intended to convey a thorough understanding of the embodiments described by providing a number of specific embodiments. It should be appreciated that the following detailed descriptions are exemplary and explanatory only and are not restrictive.

The description below describes modules that may include one or more servers, databases, subsystems and other components. As used herein, the term "module" may be understood to refer to non-transitory executable software, firmware, hardware, and/or various combinations thereof. Modules, however, are not to be interpreted as software that is not implemented on hardware, firmware, or recorded on a tangible processor-readable or recordable storage medium (i.e., modules are not software per se). The modules are exemplary. The modules may be combined, integrated, separated, and/or duplicated to support various applications and may be centralized or distributed. A function described herein as being performed at a particular module may be performed at one or more other modules and/or by one or more other devices instead of or in addition to the function performed at the particular module. The modules may be implemented across multiple devices and/or other components local or remote to one another. The devices and components that comprise one module may or may not be distinct from the devices and components that comprise other modules.

Embodiments of the system provide the ability to switch between different applications, switch settings in one or more applications, and/or output a different graphical user interface (GUI), by interpreting a sensor reading on a mobile device. The one or more applications or GUIs may be viewed on the mobile device or on another display, or both. And the particular action that take place may be based on default or user-defined settings.

Figure 1:
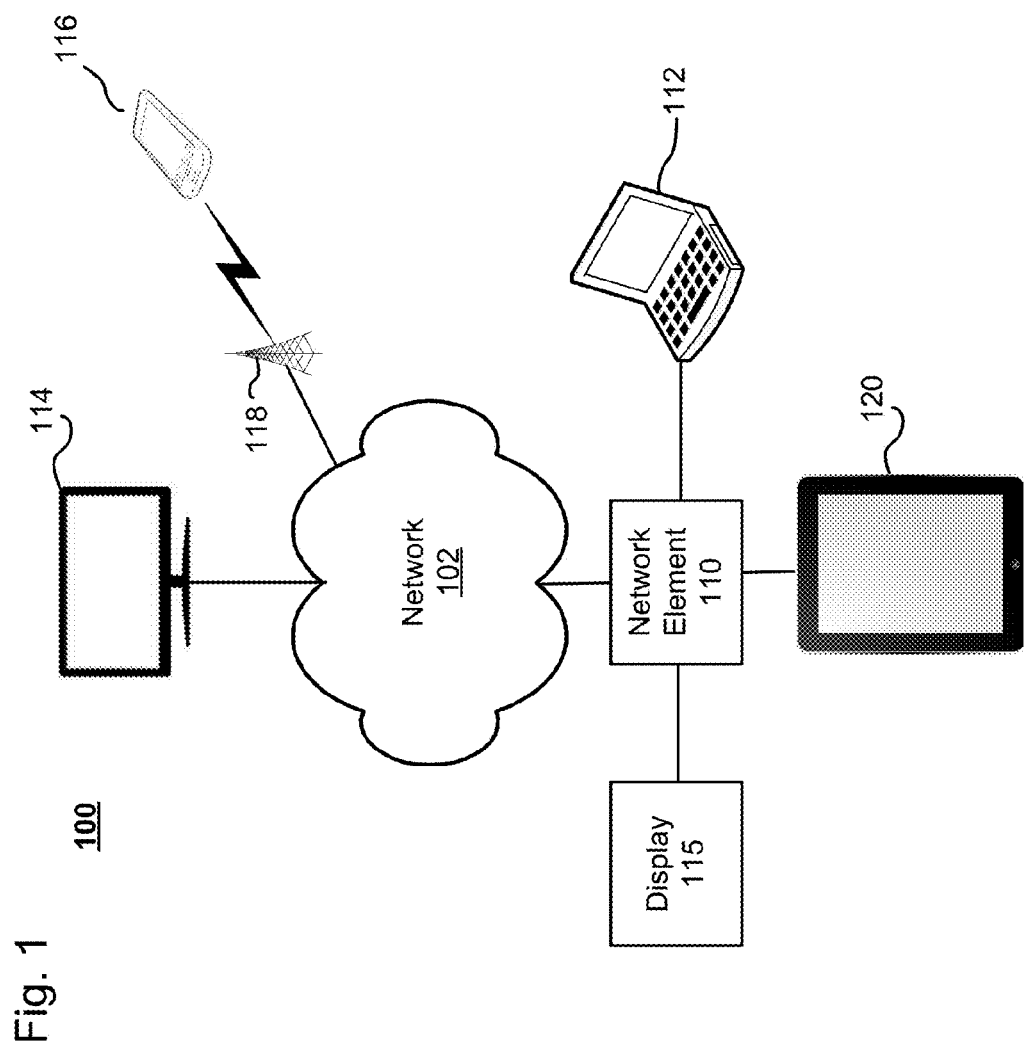
FIG. 1 depicts a block diagram of a system architecture for switching applications or performing actions based on device orientation, according to an exemplary embodiment.

Referring to FIG. 1, a schematic diagram of a system 100 for carrying out various aspects of the present invention is shown, according to an exemplary embodiment. While many types of network elements are shown in FIG. 1, the present invention may be carried out using solely a mobile device. However, FIG. 1 is included to emphasize that the present invention may be carried out over a network using multiple devices. As illustrated, network 102 may be communicatively coupled with one or more display devices, one or more data transmitting devices, network element 110, or wireless transceiver 118. Exemplary displays devices may include a mobile phone 116, mobile device 120, network client (e.g., computer) 112, display 115, or television 114, for example. These and other types of display devices may be communicatively coupled with each other, directly or indirectly with network 102, such as via one or more intermediary devices, including transceiver 118 or network element 110, for example. In particular, mobile device 120 and mobile phone 116 may be communicatively coupled directly with network 102 or via transceiver 118. Mobile device 120 and mobile phone 116 may be communicatively coupled with a local display, such as a television 114, display 115, network client 112, or another mobile device 120, for example.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support an Internet network, a wireless communication network, a cellular network, Bluetooth, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cellular network, corporate networks, or home networks.

Network client 112 may be a desktop computer, a laptop computer, a tablet, a server, a personal digital assistant, or other computer capable of sending or receiving network signals. Network client 112 may use a wired or wireless connection. It should also be appreciated that the network client 112 may be a portable electronic device capable of being transported and of communicating directly with other network elements similar or dissimilar to network client 112. Such a device may transmit or receive signals and store information in transit.

Transceiver 118 may be a repeater, a microwave antenna, a cellular tower, or another network access device capable of providing connectivity between different network mediums. Transceiver 118 may be capable of sending or receiving signals via a mobile network, a paging network, a cellular network, a satellite network or a radio network. Transceiver 118 may provide connectivity to one or more wired networks and may be capable of receiving signals on one medium such as a wired network and transmitting the received signals on a second medium, such as a wireless network.

Mobile device 120 may be a mobile communications device, a smartphone, a tablet computer, a wearable computer such as in the form of a wristwatch, bracelet, or computerized glasses (including a head-up display), a home phone, a cellular phone, a mobile phone, a satellite phone, a personal digital assistant, a computer, a handheld multimedia device, a personal media player, a mobile television, or other devices capable of displaying applications in more than one orientation. Mobile device 120 may comprise one or more of an accelerometer, a gyroscope, a barometer, or other sensor capable of detecting acceleration, orientation, or altitude. A primary type of user input to mobile device 120 may comprise the user placing mobile device 120 in one or more particular orientations by rotating mobile device 120, for example. Mobile device 120 is preferably capable of receiving other types of user input, such as in the form of a touch input, or input using a stylus, mouse, keypad, trackpad, keyboard, gesture input not using touch, motion input, or buttons, for example. Any display device capable of detecting a change in orientation may be used with the present invention, but for convenience reference will be made to a "mobile device" 120 capable of detecting its orientation.

Display 115 may a vehicle display, a head-up display (such as in a vehicle or in glasses or goggles, for example), another mobile device, a television, a computer, such as a laptop or desktop computer, a wearable computer, or any of the other displays referred to above. For convenience, reference will generally be made to display 115 that may communicate with mobile device 120, referred to above.

Network element 110 may transmit and receive data to and from network 102. The data may be transmitted and received utilizing a standard telecommunications protocol or a standard networking protocol. For example, one embodiment may utilize Session Initiation Protocol ("SIP"). In other embodiments, the data may be transmitted or received utilizing other Voice Over IP ("VoIP") or messaging protocols. For example, data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection. A number of different types of signals may be transmitted via network 102 including, but not limited to, signals indicative of information content, such as a video signal, an audio signal, or a graphical signal.

According to one or more embodiments, mobile device 120 may use a wireless connection and may authenticate with a network using Wired Equivalent Privacy ("WEP"), Wi-Fi Protected Access ("WPA"), or other wireless network security standards. Mobile device 120 may connect to network 102 and communicate with other network elements, servers or providers using WiFi, 3G, 4G, Bluetooth, or other chipsets.

Figure 2:
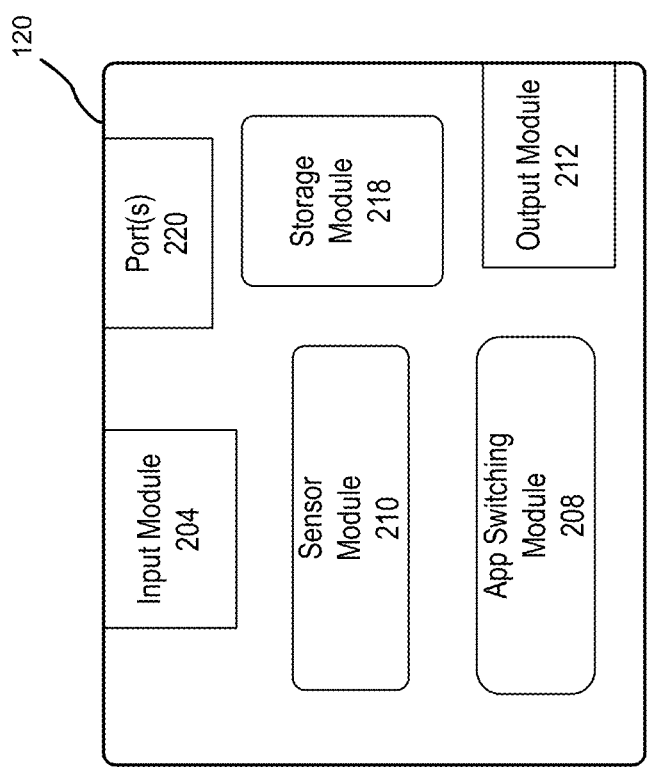
FIG. 2 depicts a block diagram of a hardware module at a mobile device for switching applications or performing actions based on device orientation, according to an exemplary embodiment.
Figure 3A:
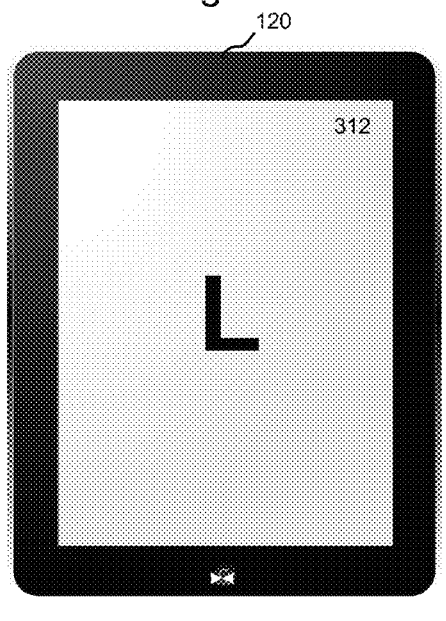
FIGS. 3A-3D depict exemplary outputs on a display screen of a mobile device based on rotation of the mobile device, according to an exemplary embodiment of the invention.
Figure 3B:
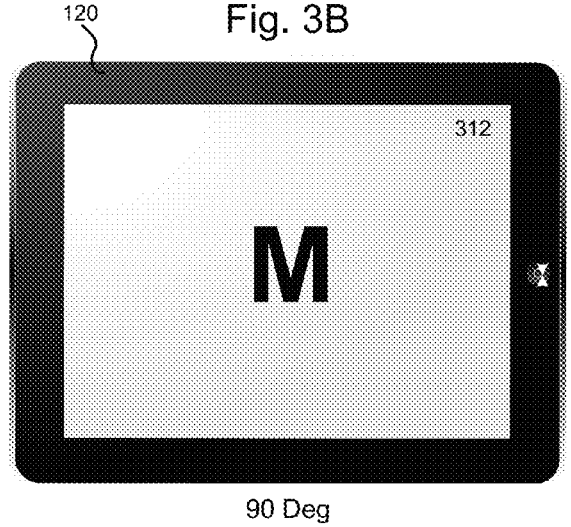
Figure 3D:
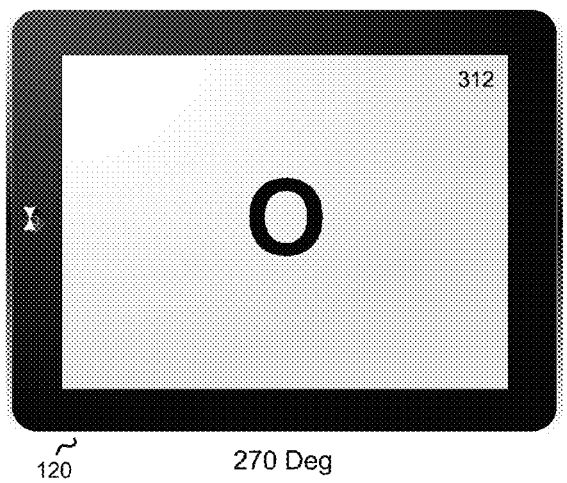
Figure 3C:
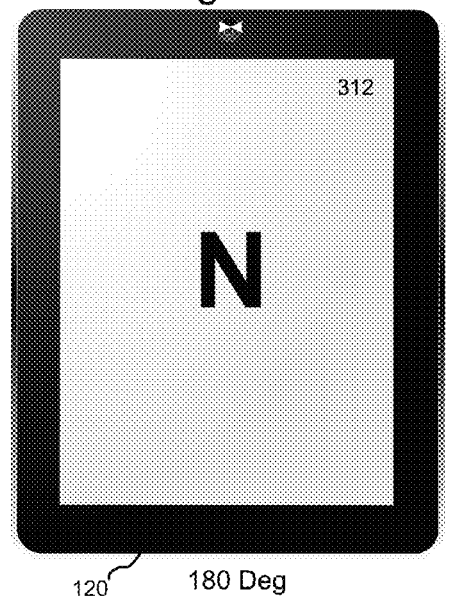

Referring to FIG. 2, a block diagram of exemplary modules within mobile device 120 for detecting device orientation and taking an action as a result, is shown, according to an exemplary embodiment. Storage module 218 may be a permanent data repository for storing information content, such as displayable content, audible content, or settings, or may be a buffer data repository when the displayable/audible content is viewed in real-time.

Output module 212 may be configured to display content, such as an application or files within an application, on the display screen 312 (shown in FIG. 3). Output module 212 may communicate with other modules, such as app switching module 208, sensor module 210 or storage module 218. For example, when sensor module 210 detects that a user has changed the mobile device's orientation beyond a predetermined threshold, such as rotating mobile device 120 by 90, 180, or 270 degrees, for example, app switching module 208 may cause the output module 212 to display a different screen output, which screen output may also be predetermined, such as based on user or default settings.

Sensor module 210 may comprise an accelerometer, a gyroscope, an altimeter, a location sensor (e.g., a GPS sensor or an iBeacon sensor), or other sensor capable of detecting a context or location of mobile device 120. Sensor module 210 may continually update a status file, which file may be stored in storage module 218 and may specify the location or orientation of mobile device 120.

Input module 204 may also work in conjunction with sensor module 210 to detect a user's desire to display a different screen output. For example, a user may press a button while changing an orientation of mobile device 120 to effect a different screen output upon changing the orientation than would be the case if the button was not pressed. In any event, input module 204 may continue to receive user inputs regardless of mobile device orientation.

App switching module 208 may receive sensor outputs from sensor module 210 or from a status file stored in storage module 218. App switching module 208 may be responsible for modifying an output to a display of mobile device 120 or an external display communicatively tethered to mobile device 120. Modifying an output may comprise, upon detecting a change in orientation, displaying a different application on mobile device 120, opening an application, minimizing an application, opening a widget, displaying or minimizing a widget, displaying a blank screen, remotely displaying content to a connected device, displaying a "hint" to a user, displaying a list (e.g., icons) of applications or widgets that may be selected by a user, displaying a list (e.g., icons) of applications or widgets that are currently running on mobile device 120, displaying one or more user menus comprising user commands that may be executed by the user (which user commands may or may not relate to the application running in the mobile device's previous orientation), or modifying playback or viewing of a file within an application (such as a video file, an audio file, a book, photos, or other media content).

Various examples of "app switching" based on device orientation are explained below with reference to FIGS. 3A-6. Referring to FIGS. 3A-3D, as orientation of mobile device 120 changes, different content may be displayed on display screen 312. For example, when mobile device 120 is at 0 degrees (e.g., portrait orientation), content represented by "L" may be displayed; when mobile device is at 90 degrees, content represented by "M" may be displayed, and when at 180 degrees and 270 degrees, content represented by "N" and "0" may be displayed, respectively. Which particular content is displayed at particular orientations (represented by degrees, for example), may be set by a user or established by default, as shown for example in FIG. 8. Exemplary "content" may include different apps running or installed on mobile device 120, or different GUIs within a single app or multiple apps running on mobile device 120. For purposes of the present invention, "app" may include the operating system running on mobile device 120.

In many situations, users may use two or more apps at a time and switch between them in the process of performing a task. For example, a user may use a video app, such as YouTube, in conjunction with a note taking app, such as Google Keep, for example. Alternatively, a maps app may be used in conjunction with an email app or an Internet browser app, for example. Using exemplary embodiments of the present invention, users may switch between apps simply by rotating mobile device 120. According to an exemplary embodiment of the invention, apps may be coupled with one or more other apps such that when one app is being used/displayed in a first orientation, the mobile operating system (or app switching module 208) knows what to display upon a change in device orientation of the mobile device 120 to a second orientation different from the first orientation. For example, when app "A" is being used in a first orientation, app "B" may be displayed when the mobile device 120 is rotated 90 degrees (clockwise or counterclockwise, for example). However, when app "C" is being used in a first orientation, app "D" may be displayed when the mobile device 120 is rotated 90 degrees (clockwise or counterclockwise, for example). Thus, user or default settings may control which action takes place upon rotation, and the particular action may depend may depend on which app is being used at the time in the first or original orientation, for example.

Figure 4:
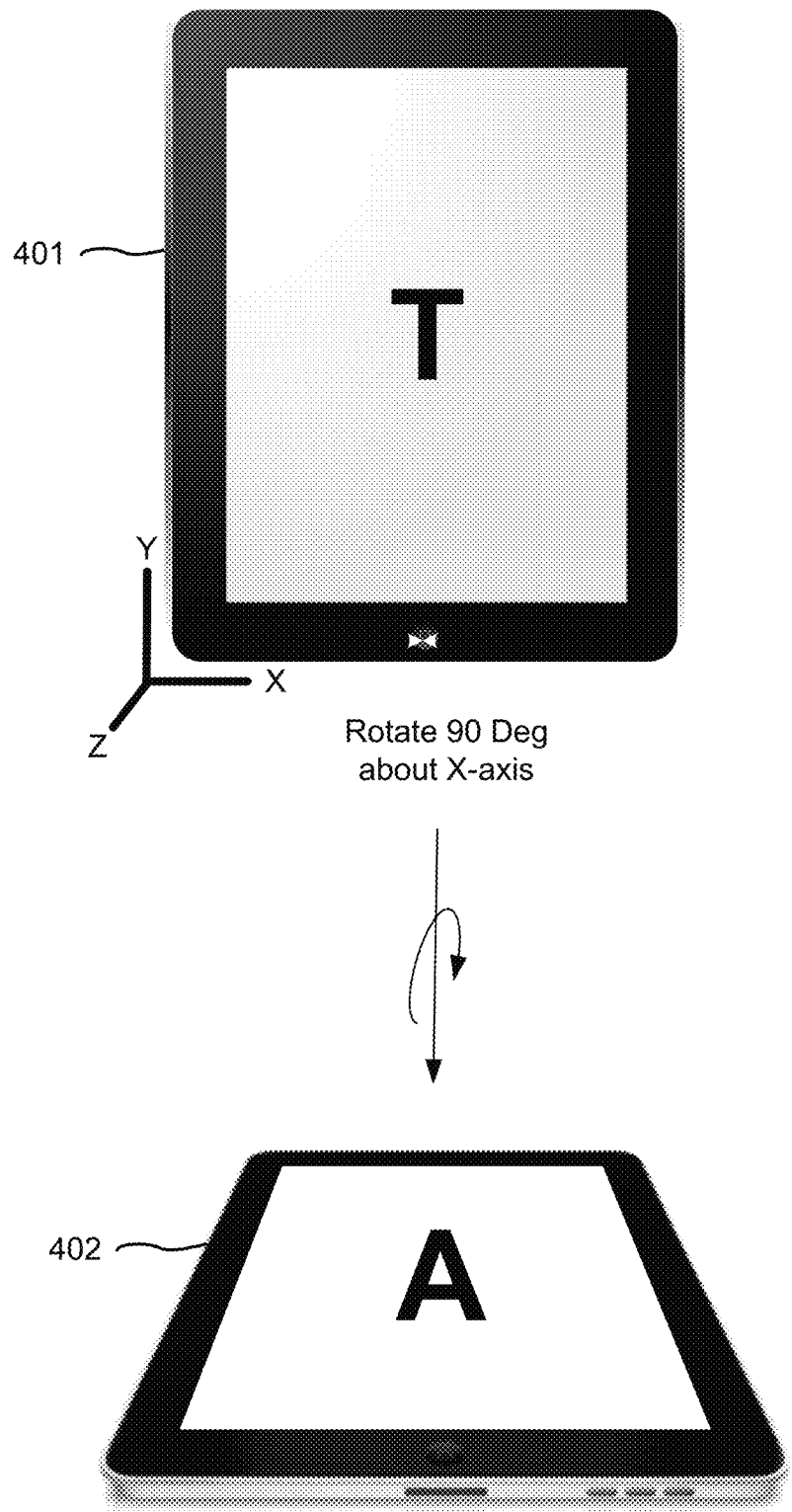
FIG. 4 depicts another exemplary output on a display screen of a mobile device based on rotation of the mobile device, according to an exemplary embodiment of the invention.

The rotations shown in FIGS. 3A-3D are rotations about one axis, such as a z-axis of mobile device 120. However, sensor module 210 may also detect rotations about other axes, such as a y- or x-axis of mobile device 120. Such rotations may be detected using an accelerometer or a gyroscope, for example, in mobile device 120. As shown in FIG. 4, a rotation about the x-axis may be detected by sensor module 210. Upon detection, app switching module 208 may cause output module 212 to switch from displaying content represented by "T" in orientation 401 to displaying content represented by "A" in orientation 402. "T" and "A" may be different applications, or different graphical user interfaces (GUIs) on mobile device 120, for example. For example, "T" may be a video application displaying a video and "A" may be another application or a keyboard pop-up, for example. "A" may appear over "T" or in place of "T" as mobile device 120 is placed on a user's lap or on a table, for example. Thus, the content displayed in "A" may comprise a portion of the content displayed in "T." For example, the video app in "T" may still be displayed in "A," but may have a keyboard (e.g., a QWERTY input keyboard) displayed atop or under the video app, or the video app may be reduced in size such that the keyboard is displayed adjacent to (e.g., under) the video app. Accordingly, content "T" may still be displayed in content "A," at least in part, but content "A" may be said to be different from content "T."

In addition to toggling between apps or displaying apps differently upon rotation of mobile device 120, various actions may take place upon rotation of mobile device 120. For example, as above, in orientation 401 a video app may be playing in "T," and upon rotation about the x-axis to orientation 402, a keyboard may pop-up and be displayed in "A." However, the video may be paused upon a change to orientation 402. Accordingly, the "action" may take place because of the change in orientation. Any apps on mobile device 120 may be implicated, and any number of actions may occur upon detection of a rotation. "T" may be a video app and "A" may be a note-taking app, for example. The content in "T" may be paused, continue to play, be minimized out of view, or reduced in size, and the content in "A" may be an app viewed in full screen, displayed atop content "T," displayed adjacent content "T," or displayed in lieu of content "T," for example. Other examples may include a video chat app through which two or more users may be communicating via video. The system may enable (e.g., turn on) a camera (front or back) on mobile device 120 when mobile device 120 is in orientation 401, for example. The system may disable (e.g., turn off) one or more cameras when mobile device 120 is moved to another orientation, such as orientation 402. Additionally or alternatively, a text chat feature including a keyboard may pop up upon moving to another orientation, such as orientation 402. Thus, two or more users may communicate via video chat in orientation 401 and then through text chat in orientation 402. The camera may continue to be enabled (e.g., turned on) in orientation 402, or may be turned off; and a keyboard for enabling text chat may be displayed only in orientation 402, based on user or app settings. Audio may continue to be transmitted between the two users in either orientations 401 or 402, but camera video may be restricted to being displayed in orientation 401, or may be displayed in a smaller portion of the display in orientation 401. A user may specify what apps are displayed, and/or what actions take place, upon a change in orientation of mobile device 120, as shown, for example, in FIG. 8.

Figure 5A:
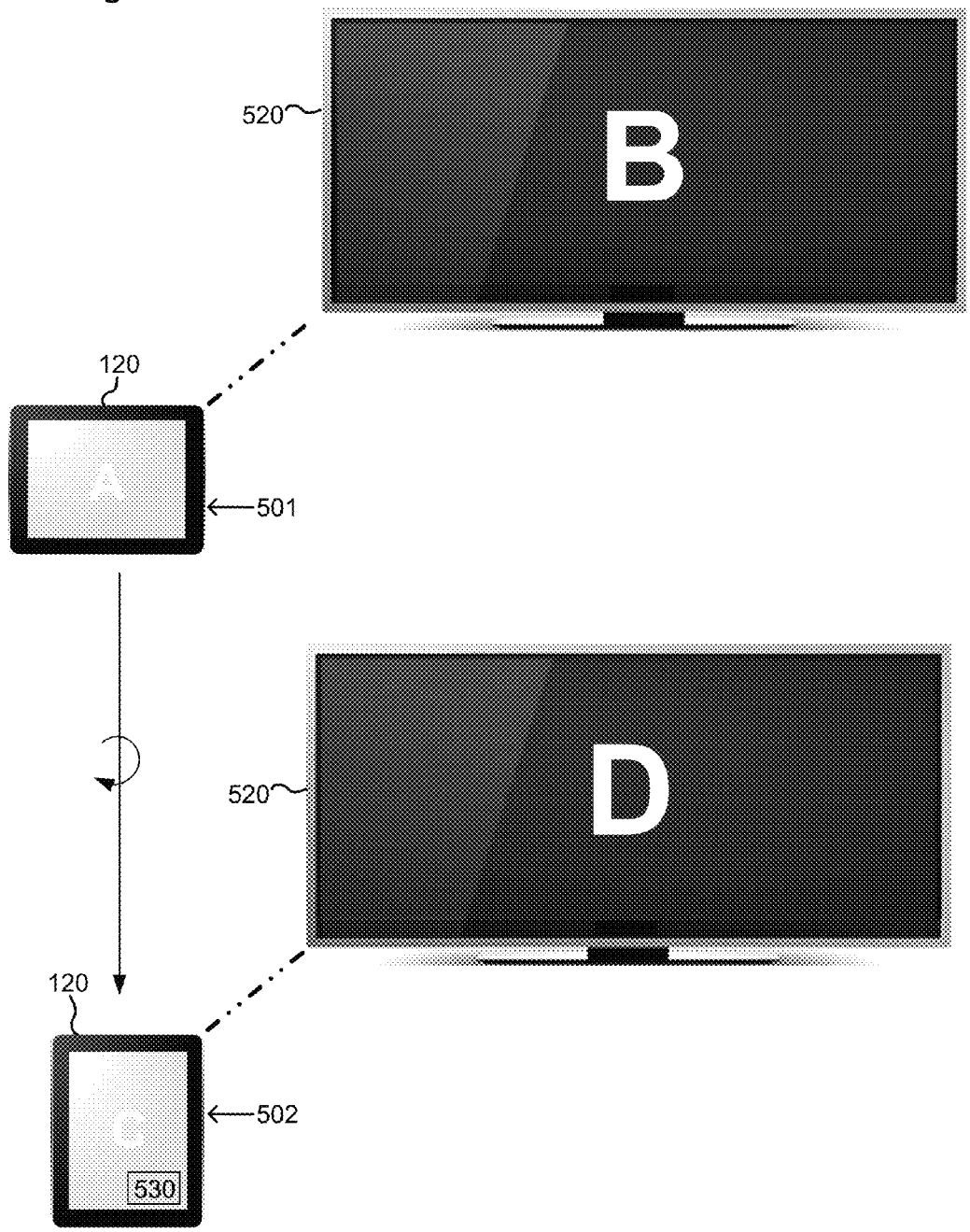
FIG. 5A depicts interaction between a mobile device and an external display that depends on orientation of the mobile device, according to an exemplary embodiment of the invention.

Device orientation may also control what features are enabled on mobile device 120. Some mobile devices allow the mobile device's screen to be replicated or displayed on another device, such as another computer or television, for example. Such a feature may be termed "remote display," and users have the option of enabling this feature on many mobile devices. However, enabling such a feature is often cumbersome and slow, requiring a user to tap a screen several times in order to enable the feature. In an embodiment of the present invention, a "remote display" feature may be enabled automatically using the device's orientation. As shown in FIG. 5A, when mobile device 120 is in orientation 501, content represented by "A" may be displayed on mobile device 120 and content represented by "B" may be displayed on external device 520, which may correspond to display 115 or television 114, for example. When mobile device is in orientation 502, content represented by "C" may be displayed on mobile device 120 and content represented by "D" may be displayed on external device 520. A, B, C, or D may represent a blank screen, may be the same application, may be different applications, or may be a different GUI within the same application, for example. By way of example, users often enjoy sharing photos or videos with a larger audience by using a larger screen. One user may locate on a mobile device a photo or video to share and then remotely display that photo or video onto an external display that is often larger than the mobile device. However, effecting the remote display is often cumbersome due to the number of user inputs required to effect such remote display. Additionally, there is often a long pause between displaying one photo or video to the "larger audience" while the user locates the next desired photo or video to display on the larger screen, particularly because the user cannot locate the next photo/video while the earlier photo/video is being displayed on the larger screen. Embodiments of the present invention overcome such difficulties and shortcomings.

Referring to FIG. 5A, a user may be in the process of locating a video or song on mobile device 120 to play on external display 520 while mobile device 120 is in orientation 501. Mobile device 120 may display content represented by "A," which may be a media library, a website, or an application, for example. External display 520 may display content represented by "B," which may be a blank screen, a copy of the user's screen on mobile device 120, photos, a screensaver, or content different than that currently being displayed on mobile device 120, for example. In an exemplary embodiment, content "B" on external display 520 may represent a blank screen. The user may locate content on mobile device 120 that he/she wishes to display on external display 520. Upon rotation of mobile device 120 to orientation 502, app switching module 208 may cause, based on user or default settings, the content on mobile device 120 to be remotely displayed on external display 520, which may be represented by "D." Mobile device 120 may display content represented by "C" at that time, which may be the same content that was represented by "A" but turned 90 degrees, a blank screen, the same content that is being displayed on external display 520 (e.g., content "D"), or content different than that currently being displayed on external device 520, for example. Thus, based on user or default settings, by rotating the user's mobile device 120, a user may automatically "remotely display" content from mobile device 120 to another device, such as external display 520.

Referring again to FIG. 5A, the user that located the content on mobile device 120 that he/she wished to show on external display 520 may have already seen such content. Accordingly, to avoid a delay in showing a subsequent (additional) desired content on external display 520, such user may be permitted to locate such additional content while the original desired content is being displayed on external display 520. For example, a user may be scrolling through media content (e.g., songs or videos, such as home or online videos) on mobile device 120 in orientation 501 and find a first video that he/she wishes to display on external display 520. Accordingly, the user may click/tap to play that particular media content and then rotate mobile device 120 to orientation 502. Upon rotation to orientation 502, app switching module 208 may cause the first media content (e.g., a video) to be remotely displayed on external display 520 (for example, the first video in "full screen" mode, e.g., without a view of the app or media library from which the first video was selected). However, rather than displaying the first video (in full screen mode or in any mode) on mobile device 120, or rather than displaying a blank screen or another screen on mobile device 120 that merely indicates that the first video is being remotely played on external device 520, mobile device 120 may continue to display the app/content (e.g., media library, website, or app) that was displayed in orientation 501 (though now turned for viewing in orientation 502, such as 90 degrees), thereby allowing the user to locate a second video (different from the first video) while others are watching the first video on external display 520. Thus, when the others are finished watching the first video, the user may immediately cause the second video to be displayed on external display 520 by (i) simply pressing play on mobile device 120, or (ii) changing the orientation of mobile device 120 again. With regard to (i), for example, the user may simply initiate playback (by pressing/tapping play, for example) and app switching module 208 may cause the content to be remotely played on external display 520 because of the orientation of mobile device 120 (e.g., orientation 502). With regard to (ii), for example, upon completion of the first video, the user may rotate mobile device 120 back to orientation 501, initiate playback of the second desired video (by pressing/tapping play, for example), and then rotate mobile device 120 back to orientation 502 to cause the second video to be displayed on external display 520. Another alternative may involve a softkey or button "530" that may be displayed on mobile device 120 when in a particular orientation (such as orientation 502), which, when tapped/selected, may cause the content (e.g., video, music, or other media) to "lock" in the external display 520 such that the content may continue to be displayed or played (e.g., the first video may continue playing on external display 520) until completion of the content (e.g., video, music, or other media) or until additional input is received from the user on mobile device 120 (e.g., pressing softkey or button 530 again). With the content "locked" to displaying/playing on external display 520 upon selection of button 530, the user may rotate mobile device 120 back to orientation 501 to locate another video or media content to display on external display 520.

In yet a further embodiment, a remote control may be displayed on mobile device 120 when it is in orientation 502, thereby allowing the user to cause the first video to be displayed on external display 520, and/or control external display 520. Once the user has caused the first video (or other media content) to begin playing on external display 520 using the remote control, for example, the user may rotate mobile device 120 back to orientation 501, thereby causing the remote control to disappear but without impacting the video (or other content) that is playing (or being displayed) on external display 520. The user may then locate another media content item or perform other tasks on mobile device 120 (e.g., use another app while the first media content is playing on external display 520). Any of the particular embodiments are effective in streamlining playback of media content from mobile device 120 to an external display 520, for example. Without long breaks in between viewing/hearing media content, the audience that is viewing or listening to external display 520 may be presented with a streamlined flow of media content and the user(s) selecting such content can have time to select the next media content item while the previously-selected media content item is playing.

Obviously, the particular orientations shown in the figures (e.g., FIGS. 5A-5B) should not be construed as limiting, but merely as indicating different orientations of mobile device 120 (e.g., between orientation 501 and 502 in FIG. 5A). Also, as in other embodiments, input module 204 may detect clicks/taps from the user, sensor module 210 may detect the mobile device's orientation, app switching module 208 may control which content is displayed on mobile device 120 and on any communicatively coupled external systems, such as external display 520, and output module 212 may effect such display outputs on mobile device 120 and any external displays. Moreover, exemplary external display 520 can be another media playing device, such as a stereo, audio/video receiver, speaker(s), or another computing device, for example.

By way of further example, external display 520 may represent a display, stereo, or media system inside a vehicle, and the functionality described above may be extended to the setting of a vehicle display. For example, when mobile device 501 is in a first orientation (e.g., orientation 501), content represented by "B" may be displayed on the vehicle display or played on the vehicle's media system. "B" may be a blank screen or may indicate that mobile device 120 is not transmitting any content from mobile device 120 to the vehicle display. When mobile device is placed in a second orientation (e.g., orientation 502), content represented by "D" may be displayed on the vehicle display or played on the vehicle's media system. "D" may represent a mapping application, a voice control feature, a phone application, a music application, or another application installed or running on mobile device 120. Orientation 502 may correspond to a mobile device mount inside the vehicle, such that when mobile device 120 is placed in the mount, thereby placing the mobile device 120 in a set orientation, app switching module 208 may automatically connect to the external display/vehicle media system. In this manner, a user need not enter various inputs in order to connect his/her mobile device 120 to the vehicle's media system/display.

Figure 5B:
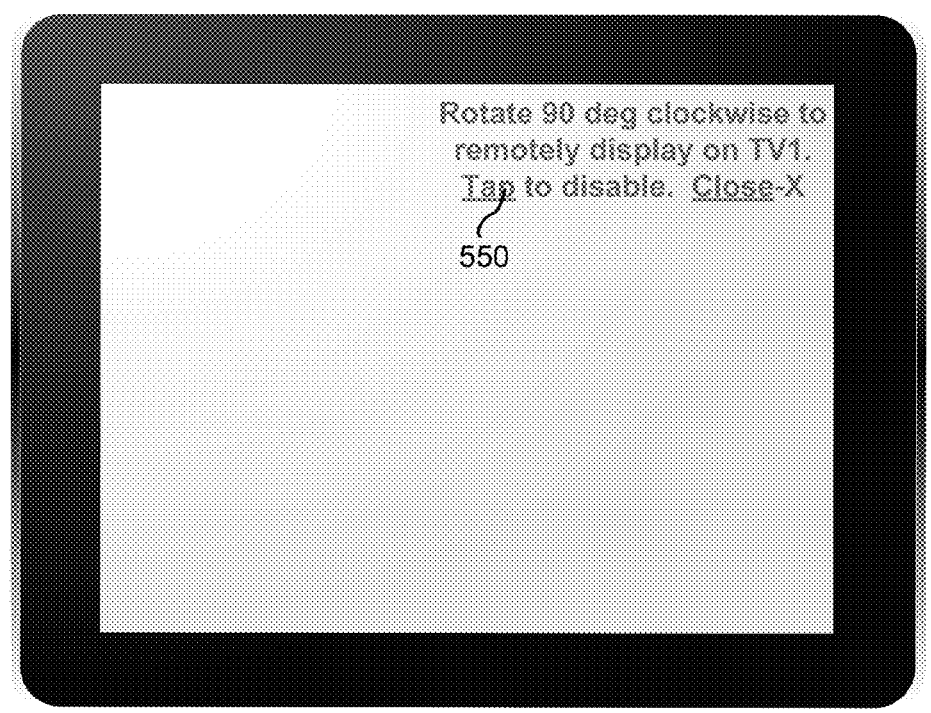
FIG. 5B depicts how exemplary hints may be displayed to a user, according to an exemplary embodiment of the invention.

Referring to FIG. 5B, various "hints" may be displayed to the user on mobile device 120 to remind the user of what will occur upon rotation to various orientations. For example, hint 550 in FIG. 5B may be displayed to inform/remind the user that by rotating the mobile device 90 degrees clockwise, for example, the mobile device's screen may be remotely displayed on a communicatively coupled system or display, such as a television in the user's family room. The hint may allow the user to enable/disable such a feature by simply tapping the hint, such as shown in FIG. 5B, for example. Upon tapping hint 550, the "remote display upon rotation" feature may be disabled. Upon tapping hint 550 again, the "remote display upon rotation" feature may be enabled. A hint may be displayed when mobile device 120 detects a nearby communicatively-coupled system/display or upon the user navigating, on mobile device 120, to a video or audio source/file, or a particular app (such as a phone or mapping app) on mobile device 120 which the user may wish to remotely display (or play or use) on an external display, system, or audio player. The hint 550 may appear for a period of a few seconds (e.g., 1-4 seconds). The hint 550 may also include a close option, which, when tapped by the user, causes the hint 550 to disappear.

Figure 6A:
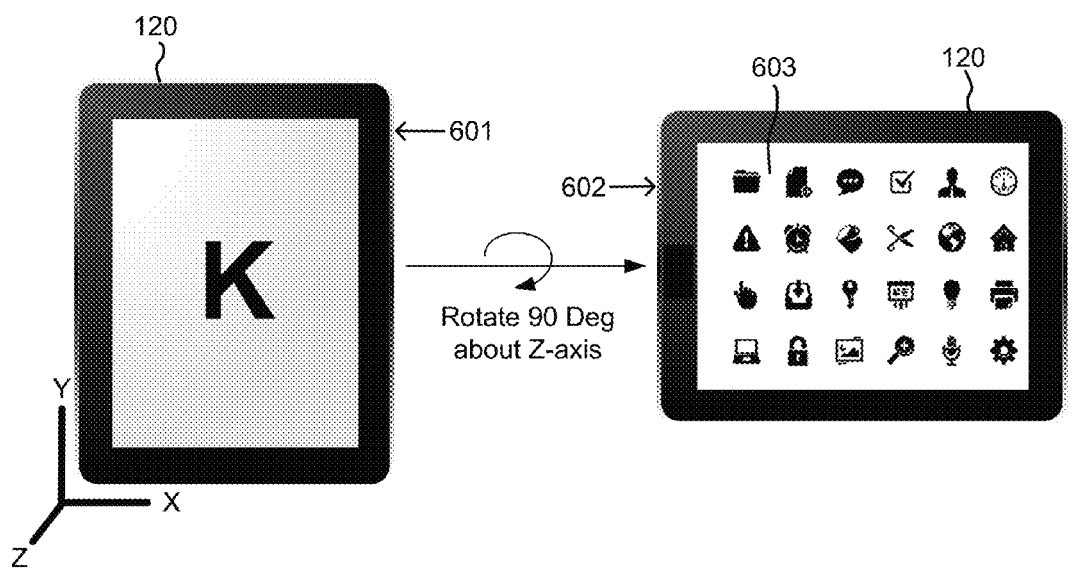
FIG. 6A depicts an exemplary output on a display screen of a mobile device based on orientation of the mobile device, according to an exemplary embodiment of the invention.

Referring to FIG. 6, another exemplary action is shown that may take place upon rotation of mobile device 120. By way of example, mobile device 120 may be in orientation 601 and may be displaying content (such as an app or a media content, for example) represented by "K." Upon rotation of mobile device 120 to another orientation, such as orientation 602, sensor module 210 may sense such a change in orientation and relay such information to app switching module 208. App switching module 208 may refer to settings stored in storage module 218 and perform a default action or a user-defined action. The exemplary action shown in FIG. 6 involves app switching module 208 displaying icons for one or more apps or a list of apps. For example, app switching module 208 may display all apps currently open on mobile device 120, all apps that may be opened (e.g., any apps installed on mobile device 120), or a select group of apps. The "select group of apps" may be pre-chosen by the user, established by default, and/or related to whatever was being displayed in the previous orientation (here, orientation 601). For example, a user may have five apps that he/she frequently uses, and may establish a user setting that causes links (e.g., icons) to those five apps to be displayed when mobile device is rotated to a particular orientation (e.g., orientation 602). Thus, the user can quickly switch between applications simply by rotating mobile device 120 and then tapping the desired app to open or switch to. Alternatively, all available apps on mobile device 120 may be displayed and/or may be scrolled through by swiping through various screens having icons of the available apps. Alternatively, the icons for apps that are displayed upon rotating mobile device 120 to exemplary orientation 602 may be related to whatever app was previously being displayed (e.g., the content represented by "K"). In a settings menu, a user may define groups of apps comprising individual apps that are related to each other. Each group of apps may have a "parent" app such that if that "parent" app is being displayed in exemplary orientation 601, then upon rotation to exemplary orientation 602, icons for the other apps in the group may be displayed. Alternatively, if any one of the apps in the group is displayed in exemplary orientation 601 (e.g., if "K" is one of the apps in the group) then upon rotation to exemplary rotation 602, icons for the other apps in the group may be displayed. An icon or link to the app that was displayed on the previous orientation (e.g., orientation 601) may also be displayed, thereby allowing the user to view the same app in a different orientation. For example, after rotating to orientation 602, one of the icons may be for the app displayed in orientation 601 (e.g., "K"). A user may simply select this icon to cause the same app to be displayed in a different orientation. In this manner, the same app may be used in multiple orientations while still presenting the user with the option to switch to a different app when rotating mobile device 120 to a different orientation. Additionally or alternatively, related apps may be specified by default such that groups of related apps may be defined with or without user input, and icons for such apps may be displayed upon rotation of mobile device 120.

Figure 6B:
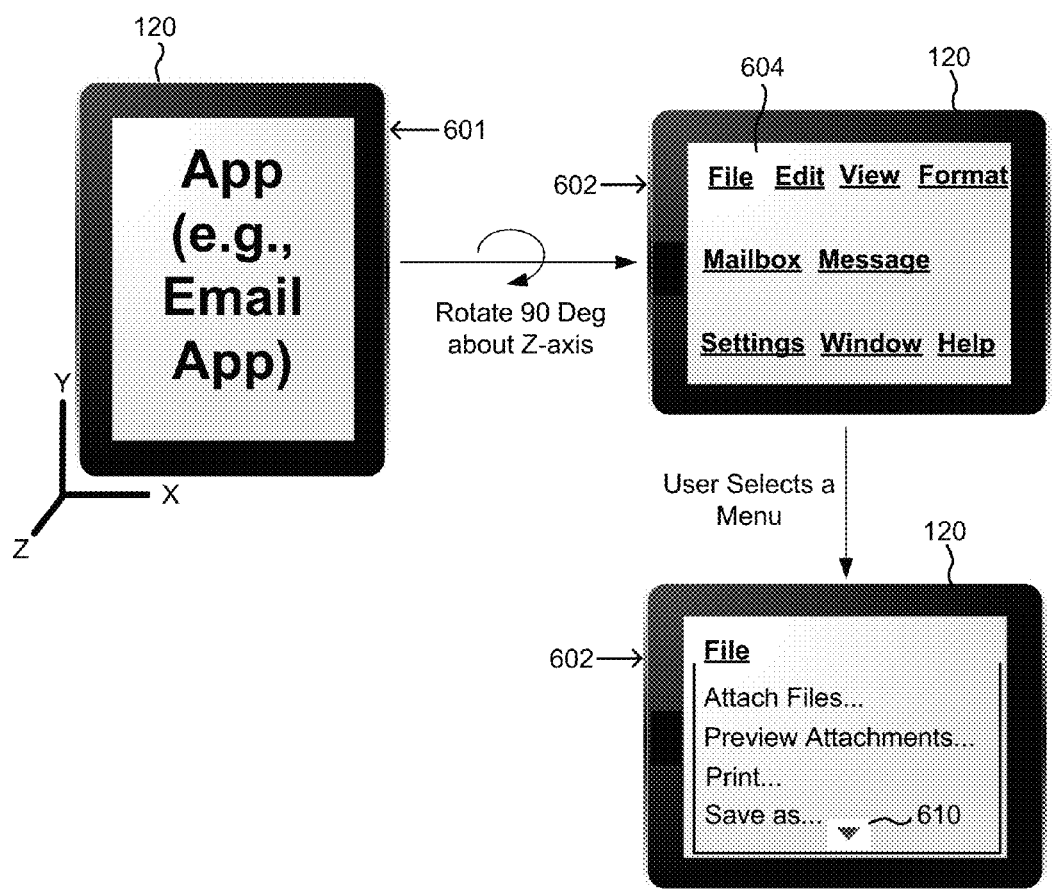
FIG. 6B depicts another exemplary output on a display screen of a mobile device based on orientation of the mobile device, according to an exemplary embodiment of the invention.

By way of further example, and with reference to FIG. 6B, additional options for a particular app displayed/running in exemplary orientation 601 may be displayed upon rotation of mobile device 120 to exemplary orientation 602. For example, "K" may represent an email app displayed/running in orientation 601. A user may be typing an email to someone and wish to attach a file or perform some other action within the email app. Upon rotating to exemplary orientation 602, various options for the particular app "K" may be displayed. Exemplary options may include attaching a file, opening an "explorer" or "finder" application to locate a file, opening an address book, inserting a picture from a photo album, inserting a video from a video album, performing a calculation using a calculator, obtaining a location or address from a mapping app, obtaining a website address from a browser app, obtaining contact info (phone number, address, email address, for example) from a phone app, or obtaining a voicemail from a voicemail app (either to listen to or attach), for example. These exemplary options may be selected in one or more menus comprising user commands. Menus 604 may be represented by icons, graphics, or text, which may comprise multiple listings of user commands, links to another app or links to a database within or communicatively coupled to mobile device 120, for example. Each app (for example, app "K" in orientation 601) may have several menus associated therewith, which may be displayed when rotating mobile device 120 to another orientation (e.g., orientation 602). Such menus 604 may be related to, or the same as, the various menus that are typically displayed on a desktop or laptop computer when running a similar or corresponding application. For example, while running an email app on mobile device 120, upon rotation to another orientation (e.g., orientation 602) various drop down lists may be provided representative of various menus that may be found in a corresponding email application on a desktop or laptop computer, including "File," "Edit," "View," "Format," "Mailbox," "Message," "Settings," "Window," or "Help," for example. A user may already be familiar with the content of these various menus, particularly if the user uses corresponding applications on a desktop or laptop computer. In this manner, "mobile apps" may truly be linked to "desktop apps," and the user may be provided with several options that are typically only available on desktop or laptop computers.

With further reference to FIG. 6B, a user may rotate mobile device 120 to orientation 602 and various titles of menus 604 may appear. Thereafter, a user may select (e.g., by tapping) the "File" menu, and various commands that can be executed on mobile device 120 may appear, which user commands typically appear in a "File" menu on a desktop computer, for example. These various commands may appear in a dropdown list, similar to the desktop environment. The menus and corresponding menu commands may or may not relate to the application that is running in the previous orientation (e.g., orientation 601). Exemplary user commands under the "File" menu may include "Attach Files," "Preview Attachments," "Print," and "Save As," for example. Other commands may be present within the particular menu, which other commands may be viewed by selecting a down arrow 610, for example. Selecting the "Attach Files" command may allow a user to navigate through an explorer/finder-type window to locate the desired file to attach to the email, for example. Selecting the "Preview Attachments" command may allow a user to view the attachments that were included with the email that the user happened to be viewing when mobile device 120 was in exemplary orientation 601. Selecting the "Print" command may enable the user to print the email, or whatever the user happened to be viewing when mobile device 120 was in exemplary orientation 601. Likewise, selecting the "Save As" command may enable a user to save the email, or whatever the user happened to be viewing when mobile device 120 was in exemplary orientation 601. A user may select the "File" menu again (e.g., by tapping the name "File"), and the menu may minimize (e.g., the various commands that can be executed on mobile device 120 may disappear) and the various titles of menus 604 may appear once again. Similar selections and functionality may be performed with other menu titles.

One of ordinary skill in the art would readily understand that other menu commands may be executed on mobile device 120, which commands may correspond to commands that are frequently executed in a desktop computing environment. For example, though not shown, the "Edit" menu may comprise various commands including, "Undo," "Redo," "Cut," "Copy," "Paste," "Paste Special," "Paste and Match Style," "Delete," "Select All," "Add Hyperlink," "Find," "Find & Replace," "Spelling & Grammar," "Start Dictation," or "Special Characters," for example. The "View" menu may comprise various commands including, "View Message Attributes," "Sort By," "View Chronologically," "View By Conversation," "View Cc Field," or "View Bcc Field," for example. The menus and menu commands are intended to be exemplary only and one of ordinary skill in the art would understand that other menus and menu commands may be utilized in the present invention. However, the method and capability of getting to such menus and menu commands involves rotation of mobile device 120, thereby enabling a user to take full advantage of the limited "screen real estate" on mobile device 120.

Figure 7:
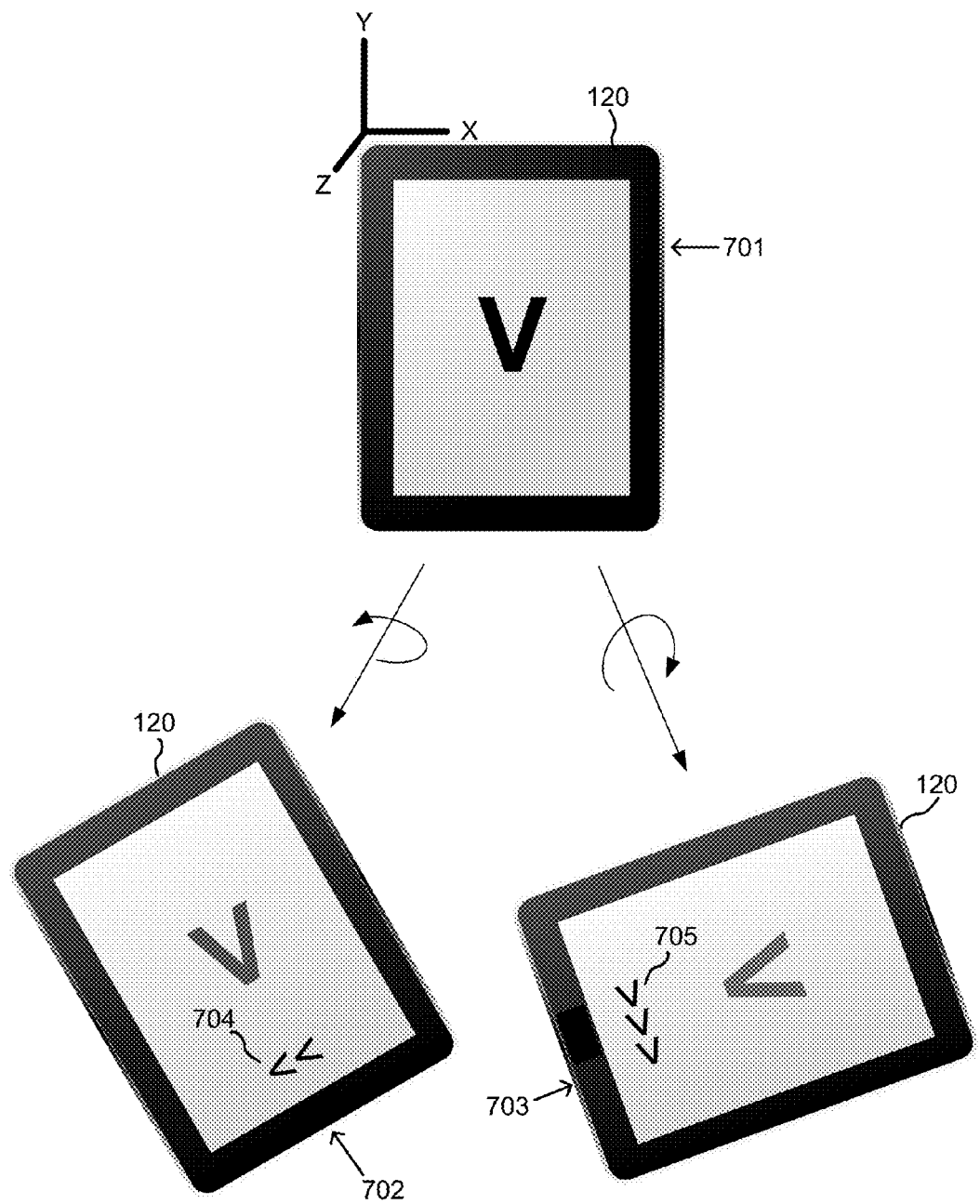
FIG. 7 depicts exemplary actions that may occur based on orientation of a mobile device, according to an exemplary embodiment of the invention.

By way of further example, and with reference to FIG. 7, additional actions for a particular app displayed/running in exemplary orientation 701 may be carried out upon rotation of mobile device 120 to another orientation, such as exemplary orientations 702 or 703. The mobile device 120 in FIG. 7 may be displaying content, such as a video or a song, and the user viewing or listening to the content may wish to advance or rewind/retract the audio or video file. Rotating clockwise, such as in the direction of exemplary orientation 703, the file may be advanced. Rotating counterclockwise, such as in the direction of exemplary orientation 702, the file may be rewound/retracted. Advancing may involve skipping to the next chapter in a movie or book, skipping to the next track on an album, skipping to another album, or skipping ahead in the particular file that is being viewed/listened to, for example. The particular action that takes place may be specified by default settings or user-defined settings. A user may specify that he/she wants to advance within the particular file and not skip to another file or portion of the same file (such as another track, video, album, or chapter, for instance) when rotating mobile device 120 clockwise. The user may wish to advance slowly or quickly. Similarly, a user may specify that he/she wants to rewind within the particular file and not skip to another file or portion of the same file (such as another track, video, album, or chapter, for instance) when rotating mobile device 120 counterclockwise. The user may wish to rewind slowly or quickly. The exemplary chevron symbols 704, 705 may appear on the screen of mobile device 120 to indicate the speed to which advancing or rewinding is taking place. For example, a user may moderately rotate (e.g., about 30 degrees) mobile device 120 counterclockwise in order to rewind content "V" moderately (e.g., every second that mobile device 120 is held in orientation 702 rewinds content "V" by sixty seconds or by one page). This may be considered a "moderate" pace of rewinding, and may be represented by exemplary symbols 704 comprising two chevron symbols. The type of symbols may be any graphical representation, and the number or type of symbols may correspond to the speed of rewinding/advancing. Later, the user may wish to advance through content "V" quickly. To do so, the user may rotate (e.g., about 80 degrees) mobile device 120 clockwise in order to advance content "V" quickly (e.g., every second that mobile device 120 is held in orientation 703 advances content "V" by ten minutes or by one chapter or by one track). Rotating to such a degree may be considered a "quick" pace of advancing, and may be represented by exemplary symbols 705 comprising three chevron symbols. In effect, the degree and direction of rotation may correspond to the degree of advancement/rewinding through media content (such as a video, song, book, or album, for example). In this manner, a user may advance or rewind through media content playing (or being displayed) on mobile device 120 without having to navigate through the particular app that is playing the media content on mobile device 120 or without having to touch the screen or any buttons of mobile device 120. Additionally, the user may control the speed or amount of advancing/rewinding through the media content (e.g., video, song, book, album) that occurs by controlling the orientation of mobile device 120.

Embodiments of the present invention may be implemented directly into the operating system of the mobile device and the various settings may be specified by a user within the operating system's settings. Alternatively, embodiments of the present invention may be implemented within an app on mobile device 120, which for the sake of clarity, may be termed a "workstation app." A user may download and install the "workstation app," which enables the user to carry out embodiments of the present invention within such an app. For example, within the workstation app, a user may specify which apps should be coupled together, such that app 1 is displayed in orientation 1, app 2 is displayed in orientation 2, app 3 is displayed in orientation 3, and app 4 is displayed in orientation 4. Users may configure the workstation app to perform various actions when mobile device 120 is in various orientations. The workstation app may be a standalone app that is used in conjunction with other apps installed on mobile device 120. The workstation app may be a "go-between" between the mobile device's operating system and the apps installed on the mobile device. For example, the workstation app may cause the mobile device's operating system to switch to another app or GUI upon rotation of mobile device 120 to a different orientation. Alternatively, the mobile device's operating system itself may carry out embodiments of the present invention. Regardless of whether embodiments of the present invention are carried out directly within the mobile device's operating system or within a "workstation app" running on mobile device 120, a user may adjust settings to carry out particular switching functions. In other words, within the operating system's settings or within the workstation app's settings, a user may specify relationships between sensor readings, which apps to display, and which actions to take.

Figure 8:
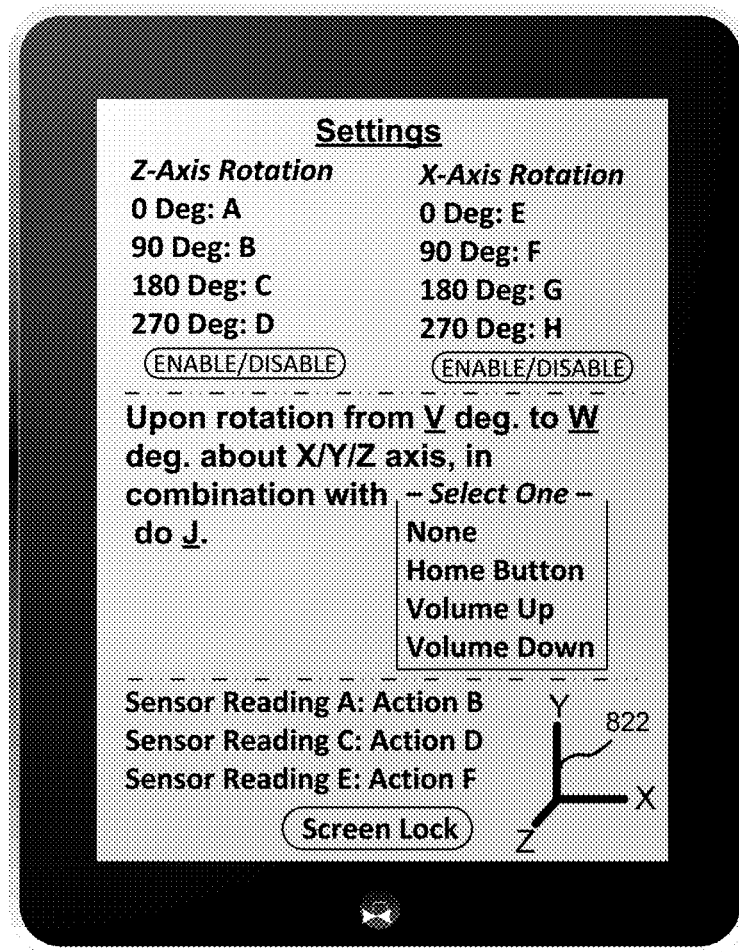
FIG. 8 depicts an exemplary settings menu where a user may view default or user-defined settings for actions that may take place based on orientation of a mobile device, according to an exemplary embodiment of the invention.

FIG. 8 shows various exemplary settings that a user may modify to control one or more switching functions. It should be noted that the settings may be default settings that do not require user input, or may be settings that are not default that do require user input. Some exemplary settings shown in FIG. 8 pertain to a sensor reading of device orientation, which orientation may be determined by a gyroscope or an accelerometer on mobile device 120, as described above. For example, a user may specify what is to occur upon rotation about one or more axes, and a coordinate reference 822 may be displayed in the user settings menu to provide a reference to the user. In an exemplary embodiment, a user may specify four different actions that may occur upon rotation about the z-axis, and four different actions that may occur upon rotation about the x-axis. With reference to the z-axis rotation, each of the referenced degrees may correspond to mobile device 120 being roughly perpendicular to the ground, as determined by an accelerometer or gyroscope within mobile device 120. A 0 degrees z-axis orientation may correspond to the mobile device 120 being upright or in portrait view; 90 degrees with mobile device 120 being sideways or in landscape view; 180 degrees with mobile device 120 being upside down in portrait view; and 270 degrees with mobile device 120 being upside down (relative to 90 degrees) in landscape view. A user may choose which apps are displayed or which actions occur upon rotation to the listed exemplary orientations. "A," "B," "C," and "D" under the Z-Axis Rotation portion of FIG. 8 may represent one or more apps that are displayed or actions that take place upon rotation to the specified orientation. By way of example, the actions may be opening or closing an app on mobile device 120, maximizing or minimizing an app on mobile device 120, changing a setting within one or more apps or within the operating system of mobile device 120, advancing or retracting in an audio or video file (such as skipping to the next chapter or going back one track in an album, for example), or may involve transmission of data to or from mobile device 120 to/from another computing device (e.g., remotely displaying content). If a user desires that no action take place upon rotation to the specified orientation, then such option may be left blank for the one or more orientations. If a user desires that no rotations about the z-axis cause any actions to occur, then the user may select the "ENABLE/DISABLE" softkey under the respective axis rotation setting. Disabling the "z-axis rotation" functionality may cause such settings to be greyed out, for example, thereby indicating that no actions will take place upon rotations about the z-axis. Similarly, if a user desires that no actions take place upon any change in orientation or upon any interpretation of sensor readings, then a "Screen Lock" option may be placed within the settings menu so the user can quickly enable/disable all switching functionality on mobile device 120.

As with the z-axis, similar functionality may be enabled/disabled with respect to the x- or y-axes. With reference to the x-axis rotation, a 0 degrees orientation may correspond to mobile device 120 being upright or in portrait view in the X-Y plane; 90 degrees may correspond to mobile device 120 being parallel to the ground in the X-Z plane; 180 degrees may correspond to mobile device 120 being upside down and the screen turned in the opposite direction from the 0 degrees orientation; and 270 degrees may correspond to mobile device 120 being parallel to the ground and face down. Similar to above, a user may choose which apps are displayed or which actions occur upon rotation to the listed exemplary orientations. "E," "F," "G," and "H" under the X-Axis Rotation portion of FIG. 8 may represent one or more actions that take place upon rotation to the specified orientation. For example, at 90 degrees when mobile device 120 is face up and parallel to the ground, "F" may comprise a keyboard popping up on the display of mobile device 120, and/or a text entry box being selected in an application such as an Internet browser application displaying a webpage (e.g., a search engine), thereby allowing a user to quickly enter text in the text entry box. By way of another example, at 270 degrees when mobile device 120 is face down and parallel to the ground, "H" may comprise the mobile device 120 going into a "sleep" mode, or turning off its display. Such may occur if a user places mobile device 120 face down on a table, for example. In such situations, mobile device 120 may turn off its display to preserve battery power. Alternatively, "H" may comprise mobile device 120 opening up or switching to a books app, particularly if the user likes to read while holding mobile device 120 up above the head while laying down.

Settings may alternatively be entered by specifying what action "J" is to occur upon rotation from "V" degrees to "W" degrees about the "X/Y/Z axis," as shown in the middle portion of FIG. 8. Each of these letters may represent a drop-down list in which the user may select a desired option. Preset degrees in drop-down lists for "V" and "W" may include 0, 90, 180, and 270, for example. Present actions in a drop-down list for "J" may include any exemplary actions referred to in the present disclosure, or other actions. Additional options may be enabled by performing a combination of rotating mobile device 120 while pressing a button on mobile device 120. For example, a user may not want any action to occur unless he/she rotates mobile device 120 while at the same time pressing a button on mobile device 120, such as a "home button" or a volume up/down button. In this manner, a user may have more control over a switching functionality tied to rotation of mobile device 120; or, through such a combination of rotation and additional user input, the user may establish (or execute) several additional "shortcut" options for performing additional actions.

Referring again to FIG. 8, other sensor readings may also be used to effect various switching functions. A sensor on mobile device 120 may detect a speed or an altitude of mobile device 120, or a characteristic(s) of an environment surrounding mobile device 120. For example, "Sensor Reading A" may be an output from a GPS sensor and/or an accelerometer on mobile device 120. "Sensor Reading A" may indicate that mobile device 120 is moving quickly (e.g., 45 mph) as determined by a time and location differential calculation using raw data from a GPS sensor, and/or that mobile device 120 is accelerating and decelerating repeatedly (such as in a vehicle driving through a city), as indicated by acceleration values from an accelerometer. App switching module 208 may analyze "Sensor Reading A" and determine that mobile device 120 is traveling in a vehicle. To a user, "Sensor Reading A" may actually read, "When Driving . . . " so the user can specify what action(s) should take place "when driving." For example, a user may specify that the mobile device's screen rotation function should be turned off "when driving" such that the mobile device's screen does not rotate upon detecting a change in g-force, or a deceleration or acceleration in a vehicle, for example. This would aid the user when using a mapping application, for example, on mobile device 120 when driving by preventing the screen (i.e., the graphical output of an app to the display of mobile device 120) from rotating such that the graphical output is upside down when the vehicle decelerates. Additionally or alternatively, a user may specify that a particular functionality on mobile device 120 should be turned on "when driving," and turned off immediately or several minutes (e.g., 5 minutes) after driving has concluded, as determined by app switching module 208, which analyzes sensor outputs from sensor module 210. The particular functionality may be enabling Bluetooth functionality, turning on a "Do Not Disturb" setting, disabling texting ability, increasing or decreasing ringer volume, increasing or decreasing navigation voice volume, changing preferred directions to driving as opposed to walking, opening an app such as a mapping app, or other actions. Any of these actions may correspond to "Action B."

By way of another example, "Sensor Reading C" may pertain to an altitude or speed of mobile device 120. An altitude measurement may be received if mobile device 120 is equipped with a barometer or other type of altitude measuring sensor. "Sensor Reading C" may indicate that mobile device 120 is flying on an airplane, as determined by an altitude measurement (e.g., 30,000 feet) or speed measurement (e.g., 500 mph). App switching module 208 may analyze "Sensor Reading C" and determine that mobile device 120 is traveling on an airplane. To a user, "Sensor Reading A" may actually read, "When flying . . . " so the user can specify what action(s) should take place "when flying." By way of example, a user may specify that mobile device 120 is to be placed in "airplane mode" upon detecting that mobile device is flying (or onboard an airplane), and switch out of airplane mode upon detecting that mobile device 120 is no longer flying. In this manner, battery power may automatically be preserved without the user having to switch in and out of "airplane mode" on mobile device 120. A user may specify that other actions also take place (or such actions may take place by default). For example, upon detecting that mobile device 120 is flying, app switching module may cause mobile device 120 to stop or start looking for wireless networks, stop or start asking to join wireless networks, enable/disable Bluetooth, enable/disable searching for cellular signals, generate and send an automatic reply to emails (e.g., "Currently flying. I'll return your email soon after landing."), or start/open a video and/or music app on mobile device 120. Any of these actions may correspond to "Action D."

Any actions that app switching module 208 performs "behind the scenes" may be accompanied by a notification displayed on mobile device 120, by output module 212. For example, if mobile device 120 is automatically placed in airplane mode upon detecting that mobile device is flying (or onboard an airplane), then a notification may pop-up notifying the user that the mobile device 120 has been placed in airplane mode. Other notifications may be displayed for other actions that app switching module 208 performs based upon detection of a new orientation of mobile device 120 or other sensor output of sensor module 210.

By way of another example, "Sensor Reading E" may pertain to a sensor reading about the mobile device's environment. For example, "Sensor Reading E" may indicate that mobile device 120 is in a very dark environment, such as in a backpack, briefcase, or pocket, or that mobile device 120 is face down such that a light sensor on mobile device 120 is not detecting any light. App switching module 208 may analyze "Sensor Reading E" and determine that mobile device 120 is in a dark environment or face down. By way of example, a user may specify that mobile device 120 is to be placed in "sleep mode" upon detecting that mobile device is in a dark environment for a predetermined amount of time (e.g., 2 minutes), or that the display screen of mobile device 120 should be powered down. Additionally or alternatively, a user may specify that other functions or programs on mobile device 120 are to continue as normal. For example, a user may occasionally enjoy listening to movies, but not watching movies on mobile device 120. Typically, when movies are playing on a mobile device, the screen is actively awaiting or attempting to detect touch input. Thus, if the user is listening via headphones to a movie playing on mobile device 120 while mobile device 120 is in his/her pocket, the user may inadvertently pause, skip, or rewind the movie, for example. However, using embodiments of the present invention, a user may specify that the screen on mobile device 120 is to be powered down without stopping the movie, when mobile device 120 is "in a dark environment" or in the user's pocket, for example. In this manner, the user will not inadvertently pause, skip, or rewind the movie, and battery power may automatically be preserved. Any of these actions may correspond to "Action F." Upon detecting that mobile device 120 is no longer in a "dark environment," the previous settings may be re-enabled (such as screen powers back on, detecting touch input, or awaking out of a sleep mode, for example).

Figure 9:
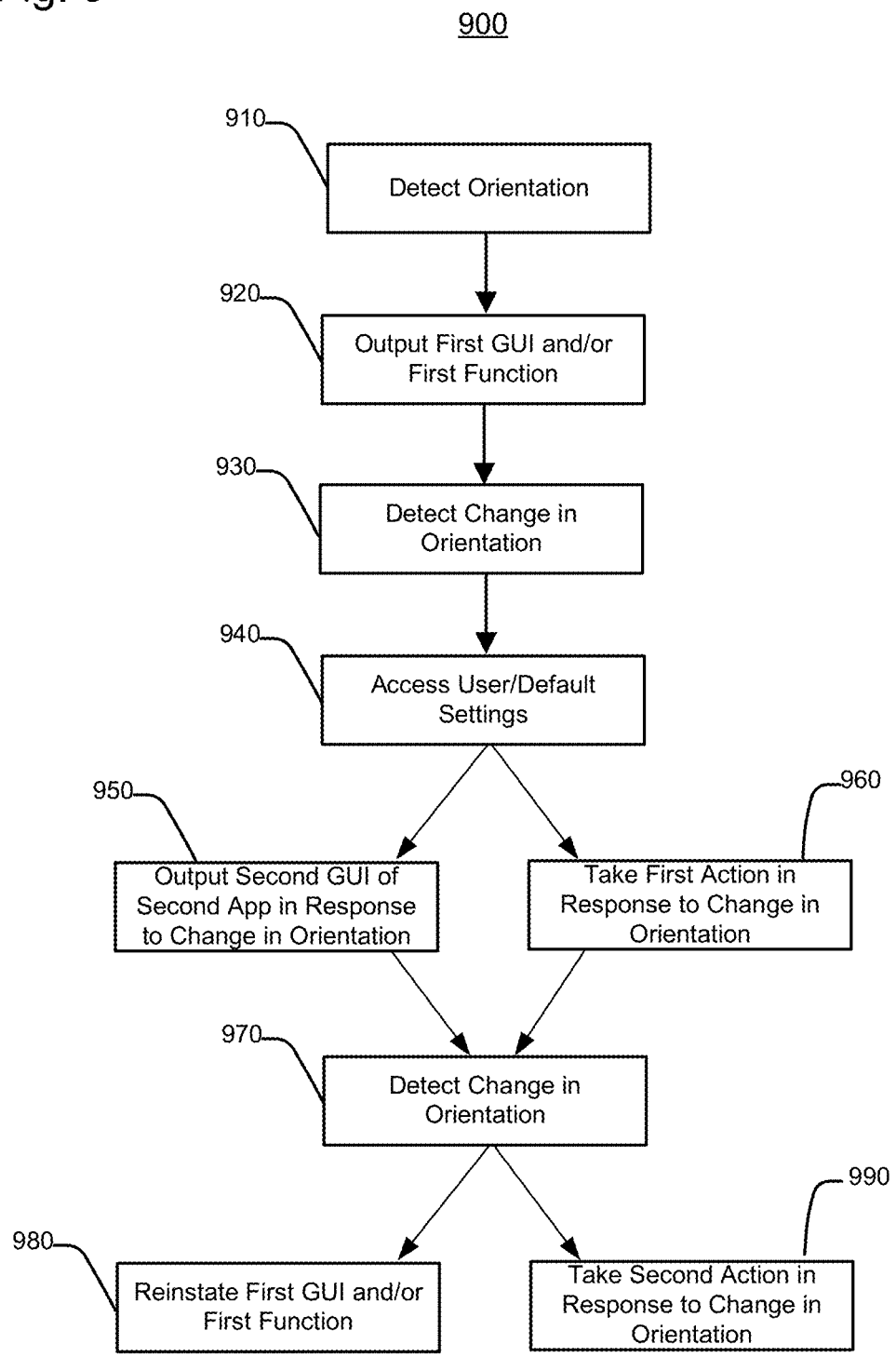
FIG. 9 depicts an illustrative flowchart of a method for modifying an output to a mobile device or taking an action involving the mobile device based on orientation of the mobile device, according to an exemplary embodiment.

Referring to FIG. 9, an illustrative flowchart of a method for switching an app or settings is shown. This exemplary method 900 is provided by way of example, as there are a variety of ways to carry out methods according to the present disclosure. The method 900 shown in FIG. 9 can be executed or otherwise performed by one or a combination of various systems and modules. The method 900 described below may be carried out by system 100 shown in FIG. 1 and mobile device 120 shown in FIG. 2, by way of example, and various elements of the system 100 and mobile device 120 are referenced in explaining the exemplary method of FIG. 9. Each block shown in FIG. 9 represents one or more processes, decisions, methods or subroutines carried out in exemplary method 900, and these processes, decisions, methods or subroutines are not necessarily carried out in the specific order outlined in FIG. 9, nor are each of them required. Referring to FIG. 9, exemplary method 900 may begin at block 910.

At 910, sensor module 210 may detect an orientation or other sensor reading of mobile device 120. The orientation of mobile device 120 may be detected by measuring a g-force acceleration using a single- or multi-axis accelerometer, for example. Such accelerometers are capable of detecting magnitude and direction of g-forces as a vector quantity to thereby sense orientation. Pairs of accelerometers at different locations on mobile device 120 may also be used to detect gradients in acceleration values relative to each accelerometer location to thereby improve accuracy of an orientation determination. In any case, one or more sensor readings are received at 910 and may also be recorded. The orientation of mobile device 120 detected at 910 may be referred to as a first or original orientation.

At 920, output module 212 may output a first graphical user interface (GUI) on a display screen of mobile device 120. The first GUI may or may not be based on the detected orientation or sensor reading of mobile device 120. The first GUI may relate to a "first" app in that the first GUI is a GUI of the first app. Additionally or alternatively, output module 212 may cause mobile device 120 to perform a first function, such as running an app, or playing a video or a song, for example. The "first function" may be performed when mobile device 120 is in the first or original orientation, and may or may not be based on the orientation detected at 910.

At 930, sensor module 210 may detect a change in orientation or sensor reading of mobile device 120 by, for example, comparing a new orientation or new sensor reading to the orientation or sensor reading detected in 910. Alternatively, a change in orientation may simply be detected by detecting a change in acceleration values (g-forces) as measured by an accelerometer on mobile device 120. Detecting a change (or lack of change) in orientation may also involve other sensors on mobile device 120, such as a location or GPS sensor. As explained above, if mobile device 120 is in a moving vehicle, an accelerometer on mobile device 120 may detect changes in acceleration values in a single plane (e.g., the X-Z plane) as the vehicle turns, speeds up, or slows down, for example. Sensor module 210 may ignore such single-plane changes in acceleration values if input from other sensors (e.g., a GPS sensor) on mobile device 120 indicate that the mobile device 120 (along with the vehicle) is turning, speeding up, or slowing down. Changes in acceleration values in multiple planes or multiple axes, however, likely suggests that the mobile device 120 itself is being rotated or moved out of coordination with the vehicle in which mobile device 120 is traveling. Such multi-axis changes in acceleration, therefore, may be interpreted as actual movement or rotation of mobile device 120 by a user within a moving vehicle, and not attributed solely to movement of the vehicle. Accordingly, sensor module 210 may ignore single-axis changes in acceleration when other sensors (e.g., GPS sensor) indicate that mobile device 120 is likely traveling on board a moving vehicle. In this manner, switching of app(s) or settings may be prevented despite an apparent sense of rotation in one plane. The orientation of mobile device 120 detected at 930 may be referred to as a second or additional orientation, which may be different than the first or original orientation to varying degrees.

Sensor module 210 may detect a change in orientation at 930, but not relay such data to app switching module 208 (or app switching module 208 may not take action) until the detected orientation crosses a threshold. In various exemplary embodiments, app switching module 208 may be configured to not take action until the detected change in orientation is about 45, 60, 70, 80, 90, 100, 110, or 180 degrees different, for example, than the detected first orientation about a particular axis (e.g., the x-axis or z-axis). This may be the case even though a user or default setting specifies that an action take place when a change in orientation of "x" degrees (e.g., 90 degrees) occurs about a particular axis. In other words, the differential threshold may be applied to a default or user-defined orientation setting, and the differential threshold may be based on the default or user-defined setting. Thus, if a user or default setting specifies that an action take place when a change in orientation of 90 degrees, then a differential threshold of 80 or 100 degrees may be applied, such that an action may occur when mobile device 120 is within 10 degrees of the 90 degree setting. A differential threshold greater than the setting (e.g., 100 degrees for a setting of 90 degrees) may be applied as a way to assure that the user is intending to rotate mobile device 120 to such a degree. The differential threshold may also be adjusted by the user.

At 940, app switching module 208 may access a default or user settings database to determine what action to take upon sensor module 210 detecting a change in orientation of mobile device 120. Default or user settings on mobile device 120 may specify what action to take (if any) based on the detected change in orientation of mobile device 120. Various exemplary settings menus are displayed in FIG. 8 and a user's saved settings, or the system's default settings, may be stored in storage module 218. App switching module 208 may access such settings in storage module 218 before taking any action.

At 950, app switching module 208 may output a second GUI of a second app in response to the detected change in orientation of mobile device 120. The second app may be different than the first app, and the first GUI or first function at 920 may relate to the first app. The second GUI may not simply be the first GUI displayed in a different orientation (e.g., rotated 90 degrees), but may relate to different user commands for the first app or a GUI for an app different from the first app. More generally, at 960, app switching module 208 may take an action in response to the detected change in orientation of mobile device 120. As explained above, this first action may take place upon the detected change in orientation crossing a differential threshold (e.g., relative to the orientation detected at 910). Various exemplary actions that may be taken are explained above with reference to various embodiments. Importantly, the first action may involve minimizing the first GUI, adjusting a size of the first GUI, making the first GUI no longer visible to the user, halting the first function, pausing the first function, or continuing the first function while taking another action. As explained above in reference to the various exemplary embodiments, and not by way of limitation, the first action may involve outputting an app different than an app displayed in the first orientation, outputting a different GUI of the app displayed in the first orientation, outputting a keyboard or a remote control, initiating or pausing a remote display or remote playing function, cause a hint 550 to disappear or appear, cause links to other apps, menus, or commands to appear, or take an action within the app displayed in the first orientation (e.g., rewinding or advancing a media content). The process may continue to 970.

At 970, sensor module 210 may detect a change in orientation or sensor reading of mobile device 120 by, for example, comparing a new orientation or new sensor reading to the orientation or sensor reading detected in 910. Similar actions may take place at 970 as took place at 930. The user may rotate mobile device 120 from the second orientation detected at 930 back to the first or original orientation or to a different orientation than the first or second orientations, which may be termed a third orientation. For example, the first orientation may be at 0 degrees, the second orientation at 90 degrees, and the third orientation at 180 degrees, about a particular axis.

At 980, app switching module 208 may output the first GUI of the first app in response to the detected change in orientation of mobile device 120. App switching module 208 may cause mobile device 120 to reinstate the first function, which first function may relate to running an app (e.g., the first app), or playing a video or a song, for example. Reinstating the first function may involve maximizing the first GUI, adjusting a size of the first GUI, making the first GUI visible to the user, un-pausing the first function, or pausing (or continuing to pause) the first function while taking another action.

Additionally or alternatively, at 990 a second action may take place in response to detecting the change in orientation at 970, which second action may be different from, or in addition to, the first action. Moreover, the second action may cause the first action to stop or pause, or the second action may allow the first action to continue while a different action (e.g., the second action) takes place. This second action may also take place upon the detected change in orientation crossing a differential threshold (e.g., relative to the orientation detected at 970). Similarly, the various exemplary actions that may be taken are explained above with reference to various embodiments. For example, the second action may involve outputting a third app different from the first and second apps, or a third GUI different from the first and second GUIs. The third GUI may be a different GUI within the first, second, or third app, and may be different than the first and second GUIs noted above. Moreover, the third GUI may not simply be the first GUI in a different orientation (e.g., upside down from the first GUI). As would be appreciated by one of ordinary skill in the art, the process may continue and additional actions or additional apps, menus, commands may be output in other orientations.

In summary, embodiments may provide a system and method for switching an app, a setting, or between apps, based on orientation of a mobile device, to allow the user to maximize screen "real estate," limit the number of user inputs required to perform a particular action, and to maximize efficiency when using a mobile device. User input, such as touch gestures or voice input, need not be performed to carry out several actions when using a mobile device if the device's orientation is taken into account when performing those actions.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

What is claimed is:

1. A method comprising:
providing, by one or more processors of a mobile device and for display, a graphical user interface of an application on a first display,
the first display being part of the mobile device that is in a first orientation;
sensing, by the one or more processors of the mobile device, a change in orientation of the mobile device from the first orientation to a second orientation;
detecting, by the one or more processors of the mobile device, a change in one or more acceleration values;
determining, by the one or more processors of the mobile device, whether the change in the one or more acceleration values is in multiple planes or axes;
accessing, by the one or more processors of the mobile device, a settings database to determine one or more actions to take based on sensing the change in orientation of the mobile device and based on determining that the change in the one or more acceleration values is in multiple planes or axes,
the change in the one or more acceleration values being ignored when:

the change in the one or more acceleration values is in a single plane or axes, and the change in the one or more acceleration values corresponds to an input from a global positioning system (GPS) sensor associated with the mobile device; and performing, by the one or more processors of the mobile device, an action of the one or more actions based on the change in orientation of the mobile device and based on accessing the settings database.

2. The method of claim 1, wherein the application is a first application; and wherein the action includes providing, by the one or more processors and for display, a second application different than the first application.

3. The method of claim 2, wherein the second application is provided, for display, on a second display.

4. The method of claim 1, wherein the change in orientation of the mobile device is caused by a rotation of the mobile device by approximately 90 degrees in at least one axis.

5. The method of claim 1, wherein at least two different applications are provided, by the one or more processors and for display, based on the orientation of the mobile device.

6. The method of claim 1, wherein the action comprises providing, in the second orientation and for display, a list of selectable applications that can be opened by a user.

7. The method of claim 6, wherein the list of selectable applications comprises applications that are already open on the mobile device.

8. The method of claim 1, wherein the action comprises providing, for display in the second orientation, one or more user menus comprising selectable user commands.

9. The method of claim 8, wherein the selectable user commands control functions of the application running in the first orientation.

10. The method of claim 1, wherein the action comprises advancing or rewinding a media file playing on or via the mobile device.

11. A non-transitory computer readable medium storing instructions, the instructions comprising:

one or more instructions that, when executed by one or more processors, cause the one or more processors to:

provide, for display, a graphical user interface of an application on a first display, the first display being part of a mobile device that is in a first orientation;

sense a change in orientation of the mobile device from the first orientation to a second orientation;

detect a change in one or more acceleration values;

determine whether the change in the one or more acceleration values is in multiple planes or axes;

access a settings database to determine one or more actions to take based on sensing the change in orientation of the mobile device and based on determining that the change in the one or more acceleration values is in multiple planes or axes, the change in the one or more acceleration values being ignored when:

the change in the one or more acceleration values is in a single plane or axes, and the change in the one or more acceleration values corresponds to an input from a global positioning system (GPS) sensor associated with the mobile device; and perform an action, of the one or more actions, based on the change in orientation of the mobile device and based on accessing the settings database.

12. The non-transitory computer readable medium of claim 11, wherein the action comprises advancing or rewinding a media file playing on or via the mobile device.

13. The non-transitory computer readable medium of claim 11, wherein the application is a first application; and wherein the action includes providing, for display, a second application different than the first application.

14. A system having comprising:

at least one processor to:

provide, for display, a graphical user interface of an application on a first display, the first display being part of a mobile device that is in a first orientation;

sense a change in orientation of the mobile device from the first orientation to a second orientation;

detect a change in one or more acceleration values;

determine whether the change in the one or more acceleration values is in multiple planes or axes;

access a settings database to determine one or more actions to take based on determining that the change in the one or more acceleration values is in multiple planes or axes, the change in the one or more acceleration values being ignored when:

the change in the one or more acceleration values is in a single plane or axes, and the change in the one or more acceleration values corresponds to an input from a global positioning system (GPS) sensor associated with the mobile device; and perform an action, of the one or more actions, based on the change in orientation of the mobile device and based on accessing the settings database.

15. The system of claim 14, wherein the application is a first application; and wherein the action includes providing, for display, a second application different than the first application.

16. The system of claim 15, wherein the second application is provided, for display, on a second display.

17. The system of claim 14, wherein the change in orientation of the mobile device is caused by a rotation of the mobile device by approximately 90 degrees in at least one axis.

18. The system of claim 14, wherein at least two different applications are provided, for display, based on the orientation of the mobile device.

19. The system of claim 14, wherein the action comprises providing, for display in the second orientation, a list of selectable applications that can be opened by a user.

20. The system of claim 19, wherein the list of selectable applications comprises applications that are already open on the mobile device.

21. The system of claim 14, wherein the action comprises providing, for display in the second orientation, one or more user menus comprising selectable user commands.

22. The system of claim 21, wherein the selectable user commands control functions of the application running in the first orientation.

23. The system of claim 14, wherein the action comprises advancing or rewinding a media file playing on or via the mobile device.

* * * * *